United States Patent [19]
Brown

[11] 3,744,565
[45] July 10, 1973

[54] APPARATUS AND PROCESS FOR THE SOLUTION AND HEATING OF SULFUR CONTAINING NATURAL GAS

[75] Inventor: Larry P. Brown, Tulsa, Okla.

[73] Assignee: Cities Service Oil Company, Tulsa, Okla.

[22] Filed: Jan. 22, 1971

[21] Appl. No.: 108,822

[52] U.S. Cl.................. 166/267, 166/311, 166/314
[51] Int. Cl............................................. E21b 43/00
[58] Field of Search .................... 299/4, 5; 166/267, 166/314, 311

[56] References Cited
UNITED STATES PATENTS

| | | | |
|---|---|---|---|
| 2,754,098 | 7/1956 | Heinze | 299/6 |
| 3,488,092 | 1/1970 | Dean | 299/5 |
| 3,498,887 | 3/1970 | McClintock | 203/21 |
| 3,531,160 | 9/1970 | Fisher | 299/5 |
| 3,415,573 | 12/1968 | Fraser | 299/4 |
| 3,393,733 | 7/1968 | Kuo | 166/267 |

Primary Examiner—Robert L. Wolfe
Attorney—J. Richard Geaman

[57] ABSTRACT

A hydrocarbon well producing principally hydrogen sulfide, carbon dioxide and free sulfur is produced by pumping a solvent into the well to dissolve the free sulfur contained therein. The solvent is heated and introduced at a point within the production string at which the sulfur would normally begin to precipitate from the produced gas stream.

2 Claims, 2 Drawing Figures

APPARATUS AND PROCESS FOR THE SOLUTION AND HEATING OF SULFUR CONTAINING NATURAL GAS

BACKGROUD OF THE INVENTION

This invention relates to the recovery of sulfur and hydrogen sulfide from hydrocarbon wells. More particularly, the invention relates to the introduction of a heated solvent into the annulus formed between the production tubing and the casing string in a natural gas well at a depth within the production string at which sulfur would normally precipitate in the production string.

Recent deep natural gas discoveries in excess of 15,000 ft. and having a bottomhole pressure in excess of 15,000 psi have produced natural gas containing extremely high concentrations of hydrogen sulfide ($H_2S$) and elemental sulfur The particular problem is paramounted by elemental sulfur being precipitated from the natural gas stream in the production string and thereby obstructing the wellbore, causing blowouts and other severe wellbore conditions to occur. The prior art has proposed methods for the introduction of a solvent, for example, benzene, toluene, xylene and naptha and mixtures thereof, into the bottomhole of a production string. Solvent introduction produces a well fluid containing hydrogen sulfide, carbon dioxide, natural gas and sulfur dissolved in the solvent, with the well effluent being fractionated to obtain an overhead rich in hydrogen sulfide and natural gas, and bottoms rich in sulfur and solvent. The overhead is further treated to obtain a stream consisting essentially of hydrogen sulfide which can be processed for its sulfur content. The bottoms containing solvent, benzene or another solvent is fractionated to obtain a solvent vapor stream and the residual sulfur content. Steam stripping may be used for the fractionation to obtain therefrom solvent free malt sulfur and solvent vapor which may be passed through a condensor, reliquefied and then recycled and injected into the well stream for the continuous solution of sulfur therein.

The inherent problem involved in solvent circulation in sulfur containing wells is the need for extreme amounts of solvent to be introduced to retain solution of the sulfur in the production stream to prevent precipitation of sulfur and blockage of the production stream. Coupled with these problems are the pumping requirements necessitated for introducing the benzene or other solvent at pressures in excess of the bottomhole pressure such that the production tubing flows correctly without backflow into the annular portion of the production system and for supplying adequate solvent to the production string.

Therefore, it is understood that certain underground formations produce gas which contain elemental sulfur in solution. These wells are difficult to produce continuously as the sulfur tends to precipitate or come out of suspension in the production string and prevents further gas flow therethrough. As the precipitation of sulfur is a one-way process which is difficult to correct, sulfur deposits fill the production string, thereby blocking flow. The solvent must be recirculated within the flow stream in a continuous fashion so that the sulfur which otherwise would collect in the production string is removed by remaining suspended therein.

What is required is apparatus and a process whereby the elemental sulfur contained within hydrocarbon production streams may be held in suspension to avoid surface separation equipment failure, production tubing failure and dangerous wellbore conditions to be encountered with the production system.

It is an object of this invention to provide apparatus and a process for the recovery of sulfur and hydrogen sulfide from gas wells.

It is a further object of the present invention to provide for the recovery of sulfur and hydrogen sulfide from a solvent circulated within sulfur containing gas production wells.

It is still a further object of the present invention to provide a process for maintaining sulfur in suspension throughout a gas production string which utilizes minimal energy dissipation and requires minimum solvent introduction into the production string.

With these and other objects in mind, the present invention may be more fully understood by specific referral to the accompanying drawing and following description:

SUMMARY OF THE INVENTION

The objects of the present invention are accomplished by a process for maintaining sulfur in suspension in hydrocarbon producting wells. from which hydrocarbons and sulfur composite are produced. The process comprises injecting a solvent into the production well. The solvent is introduced in the production tubing string at the depth at which sulfur precipitation normally occurs. The solvent-sulfur rich hydrocarbon mixture is produced from the well with the sulfur removed therefrom and the solvent recovered, recycled and reinjected into the well. Generally, the solvent will be heated and introduced at that depth within the well at which sulfur precipitation normally occurs. It is within the scope of the present invention that the solvent injection stream be split such that a portion of the solvent be produced from the outer annulus formed between a casing string and the wellbore liner.

Apparatus for maintaining sulfur in a solution within the conception of the present invention may comprise a completed hydrocarbon producing well comprising production tubing extending from the surface to a depth at which sulfur precipitation normally occurs may be used in conjunction with means for isolating the wellbore liner from the production tubing. In conjunction with the production tubing may be means for introducing a solvent into the production string and means for reclaiming the solvent from the production string and recycling the solvent to the production string.

BRIEF DESCRIPTION OF THE DRAWING

The present invention may be more fully understood by referral to the accompanying Figures in which.

DETAILED DESCRIPTION OF THE INVENTION

The present invention comprises an apparatus and a process for the production of elemental sulfur, $H_2S$ and natural gas, under high pressures. Bottomhole pressures and temperatures encountered in a well may exceed 15,000 psi and 400°F., respectively. The process comprises maintaining sulfur in solution in the well by the injection of a solvent into the production string at the depth at which sulfur precipitation normally would occur. The solvent-sulfur-natural gas-H$_2$S mixture is then produced from the well with the components of the mixture being separated with recycling and reinjection of the solvent into the production well stream.

Figure 1:
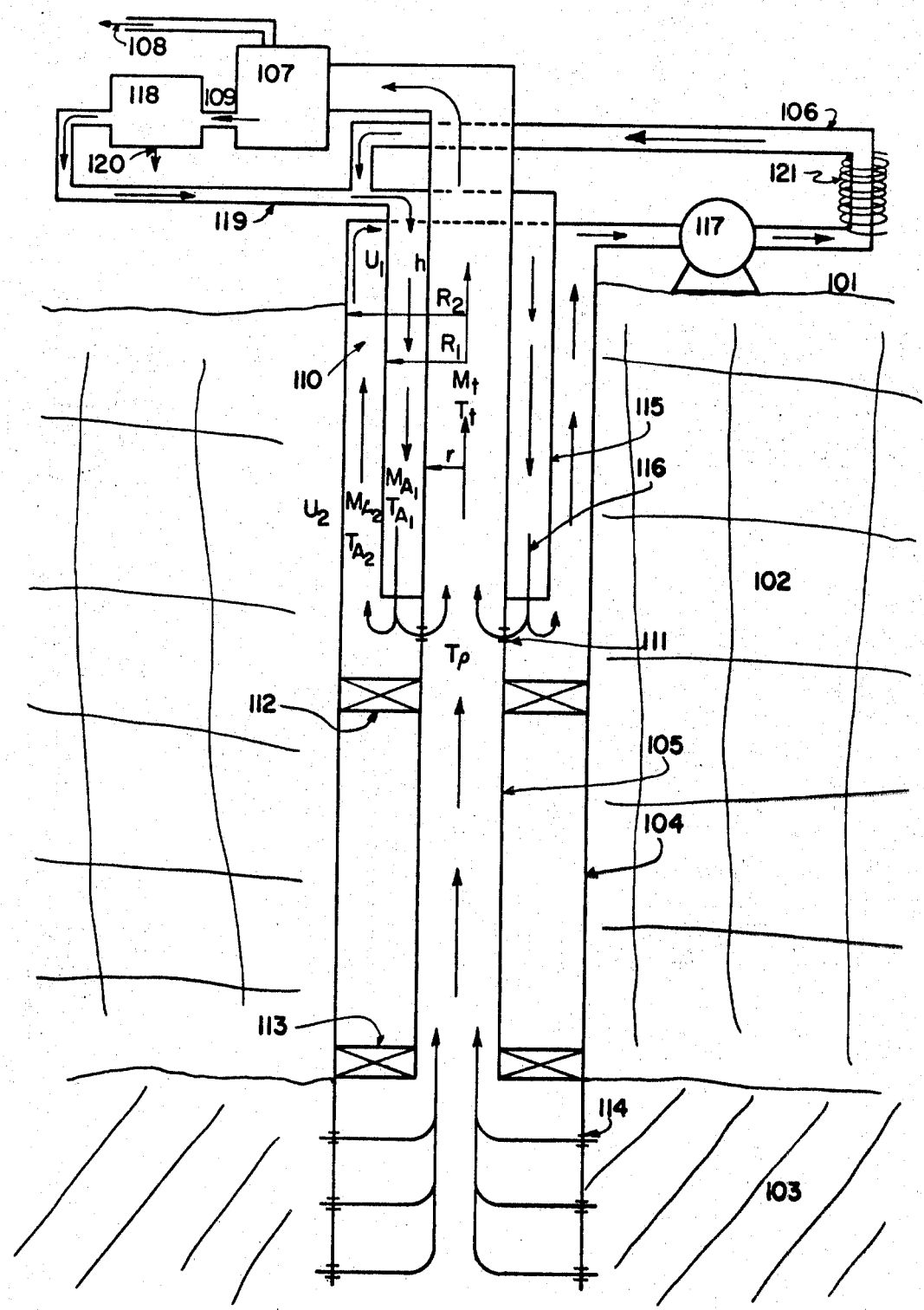
FIG. 1 represents one embodiment of the apparatus and process of the present invention is depicted.

The apparatus of the present invention may be more fully understood by referral to accompanying FIG. 1 in which is depicted one embodiment of the present invention in which solvent injection and heating means are applied to a natural gas production well. The well is completed with wellbore liner 104 from the earth's surface 101 through overburden section 102 and into reservoir of interest 103. The production string 105 is hung within the well and passes through an isolation means, for example tubing packer 112, which is positioned at a point at which the natural gas stream will naturally precipitate elemental sulfur from the system. The production string 105 is further isolated from reservoir of interest by isolation means, for example hydraulic set packer 113 and perforated through perforations 114 through which the production fluid enters the production string 105.

A casing string 115 is hung within the upper section of the production well and is concentric to production tubing string 105 so as to form an outer annulus 110 between the completed wellbore liner 104 and concentric casing string 115 and the production tubing string 105. Heated solvent is then introduced into the inner annulus 116 and flows downwardly, intersects tubing packer 112, at this depth the heated solvent stream is split. A portion of the stream is introduced through perforation 111 into the natural gas production stream flowing within production tubing string 105, so as to further dissolve the elemental sulfur contained within the natural gas system and thereby hold the sulfur in suspension. This solution prevents precipitation of the sulfur. The other portion of the solvent stream traverses the outer annulus 110 so as to further insulate the production tubing string 105 and the contents thereof and retain the elemental sulfur in solution.

Auxiliary apparatus are provided consisting of separator 107 having a heating element therein such that the solvent is extracted from the lower portion 109 thereof. The solvent passes through a sulfur extractor 118 and is reinjected into the inner annulus 116 through exit stream 119. Natural gas and its hydrogen sulfide content from the production stream is produced from the upper portion of the separator 108, while the elemental sulfur is carried with the solvent from the exit 109 and removed in the elemental sulfur extractor at exit 120. The solvent stream 106 from outer annulus 110 passes through a pump 117 and heater 121 and is reintroduced into the exit stream 119 in conjunction with that solvent stripped from the production string, is comingled therewith and reinjected therein the inner annulus 116.

Therefore, in continuous operation, the production string above the point at which sulfur precipitation normally would occur is both heated and enriched with solvent, thereby retaining sulfur in solution, while providing an easily removable solvent stream which is continuously circulated with the gas production to avoid sulfur buildup in the production apparatus and inhibit failure of the production string.

The particular applicability of the present invention may be more fully understood through illustration in the form of the following example:

EXAMPLE

Figure 2:
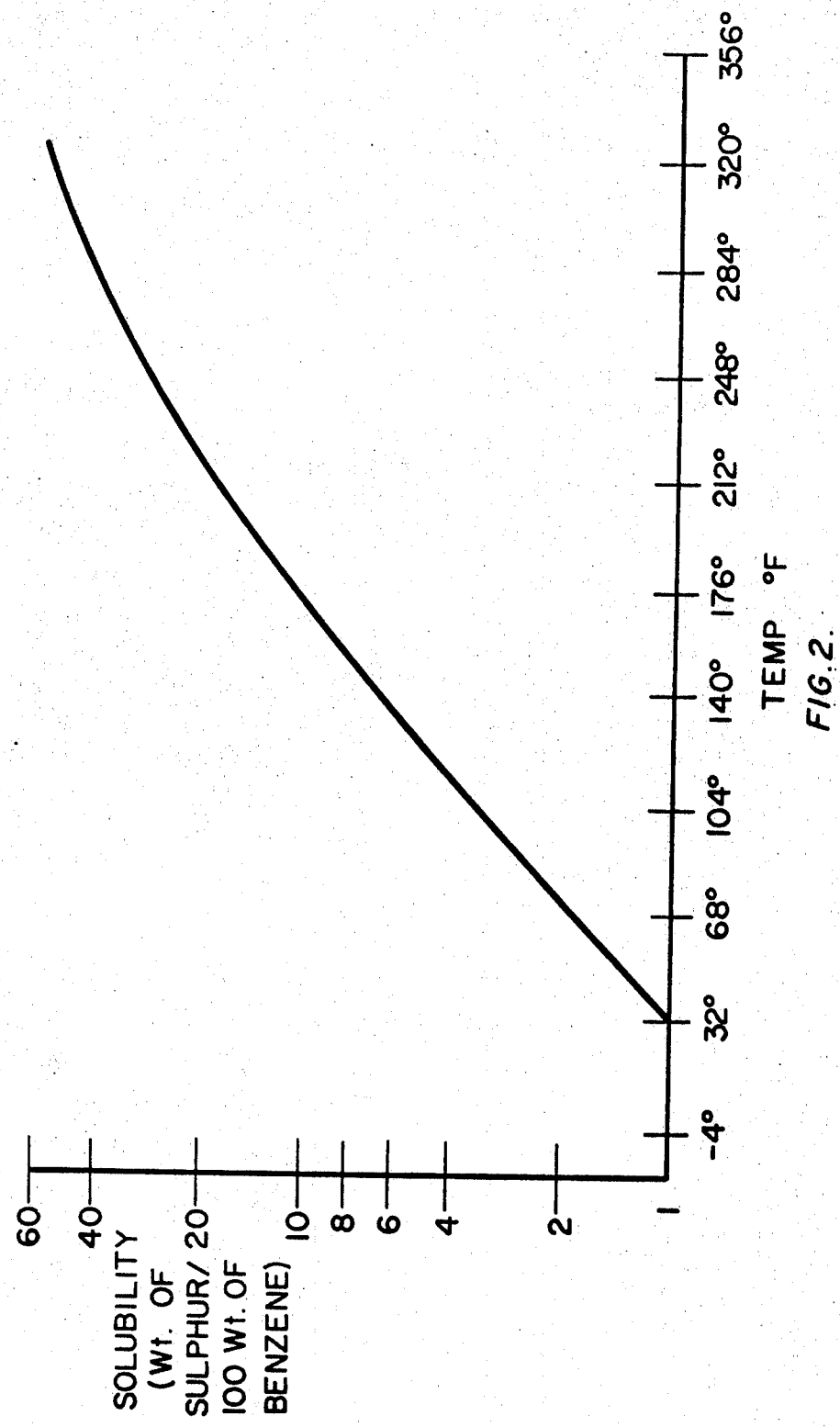
FIG. 2 represents the solubility of benzene, a preferred solvent, for various conditions of temperature in a wellbore.

A natural gas, sulfur and hydrogen sulfide composite was produced from a wellbore at the rate of 53,500 pounds per day. Apparatus as depicted in FIG. 1 provided through which heated solvent circulated. Half of the solvent was introduced into the tubing string and half was circulated up the outer annulus to provide an insulating barrier against wellbore heat loss to the formation. Benzene is utilized as the solvent with a sulfur composite solubility curve as depicted in FIG. 2. Benzene was circulated at a rate of 67,000 pounds per day.

Equations may be developed to describe the thermal dynamics of the apparatus of the present system and are represented by the following formuli:

$$M_{A_1} C_{PA} (dTA_1/dx) + 2\pi rh (T_{A_1} - T_t) = 2\pi R_1 U_1 (T_{A_2} - T_{A_1})$$

Heat balance on the outer annulus;

$$M_{A_2} C_{P_A}(dTA_2/dx) + 2\pi R_1 U_1 (T_{A_1} - T_{A_2}) + 2\pi R_2 U_2 (T_f - T_{A_2}) = 0$$

Heat balance on the tubing string;

$$M_t C_{Pt} (dT_t/dx) = 2\pi rh (T_t - T_{A_1})$$

The solvent material balance; and $$M_{A_2} = (1-\epsilon) M_{A_1}$$

The geothermal gradient in the earth;

$$T_f = T_s + GX$$

wherein:

$M_{A_1} = 67000$ lb/D
$C_{P_A} = CP_t = C_{P_p} = 0.4$ BTU/lb °F
$r = 1.5$ inches
$h = 30$ BTU/hr ft$^2$ °F
$R_1 = 3.0$ inches
$U_1 = 10$ BTU/hr ft$^2$ °F
$R_2 = 4.5$ inches
$U_2 = 1.0$ BTU/hr ft$^2$ °F
$T_s = 60$°F
$G = 1.5$°/100 ft
$L = 1500$ ft = fraction of solvent stream diverted to tubing = 0.5
$M_t = 53,500$ lbs./D
$T_{A_i} = 200$°F.

The appropriate temperature symbols are dipicted on FIG. 1. The equations may be solved numerically at the point of injection of the solvent stream
at $X = 0$  $T_A = I_A$ the tubing string by assuming the following boundary conditions:
at $X = O$  $T_A = T_{A_i}$
at $X = L$  $T_{A_2} = T_{A_1}$
at $X = L$  $M_t C_{P_t} = \epsilon M_{A_1} C_{P_A} T_{A_1} + (M_t - \epsilon M_{A_1}) C_{P_p} T_p$ Solving these equations at the above boundary conditions for the values indicated reveals the temperature distributions listed in Table 1.

TABLE 1

| Temperature | °F |
|---|---|
| $T_{A_2}$ | 146 |
| $T_{A_1}$ | 156 |
| $T_t$ | 154 |

Therefore, the temperature of the production stream at the surface and atmospheric pressure is 154°F. Without circulation, the flow stream would arrive at the surface at approximately surface temperature, 60°F. This is the worst condition since the lowest pressure is at the wellhead and solubility increases with increased pressure and temperature. Through a similar design procedure, the solvent circulation stream may be designed for each production application to insure that no sulfur precipitation will occur within the wellbore.

It is preferred that the apparatus and process of the present invention utilize standard wellbore production equipment. Various and sundry equipment configurations for accomplishing the process and apparatus of the present invention may become apparent to those familiar in the art of elemental sulfur production. It is noted that the solvent may be introduced at any depth within the wellbore completion as long as the point of injection of solvent is below that point at which elemental sulfur will precipitate freely from suspension. Therefore, through exact engineering, the apparatus may be provided to form a failsafe system by which natural gas containing elemental sulfur and hydrogen sulfide may be produced from extremely high pressure and temperature formations with no precipitation of elemental sulfur occurring. It is also noted that the amount of heating may be directly proportional to the amount of solvent introduced into the production string. Accordingly, the economics of the system will control what amount of heating is desirable in conjunction with the solvent injection. Therefore, each individual gas well must be analyzed so that one may predict the exact amount of heating desirable and the depth at which solvent introduction into the production tubing string is required and the exact quantities of solvent required to sustain the sulfur suspension within the production string.

It has been found that solvents selected from the group consisting of saturated and unsaturated cyclohydrocarbons and fractionated petroleum distillates give excellent solubility of the sulfur in the natural gas production string and thereby avoid sulfur precipitation within the production well string and separation equipment. It is preferred that easily obtainable solvents such as benzene, xylene, toluene, petroleum fractions and aromatics be utilized within the process of the present invention as they are easily separable from the natural gas system. And if they contaminate the system, they would not present hazards for the further refinement and utilization of the natural gas produced from these sulfur containing wells.

Therefore, through use of the apparatus and process of the present invention, elemental sulfur may be contained within the gas stream for complete production of the hydrogen sulfide, sulfur and natural gas from the reservoir to the surface and through the separation equipment without dangerous wellbore and surface conditions occurring. The process and apparatus of the present invention allows for the production of elemental sulfur, especially under extreme conditions of temperature and pressure, without requirement of complicated equipment, thereby providing a failsafe method and apparatus for hydrocarbon production.

The present invention has been described herein with respect to particular embodiments thereof. It will be appreciated by those skilled in the art, however, that various changes and modifications can be made without departing from the scope of the invention.

Therefore, I claim:

1. A process for maintaining sulfur in suspension in a completed producing well having an inner annulus formed between a tubing string and a casing string and an outer annulus formed between the casing string and the wellbore and which is drilled in excess of approximately 15,000 ft. with a bottomhole pressure in excess of approximately 15,000 psi and from which hydrocarbons and sulfur composite are produced, which comprises:

a. injecting a heated solvent into said inner annulus in the production well at the depth at which sulfur precipitation normally occurs to split said solvent into a first portion and into a second portion wherein said first portion enters said tubing string and said second portion is produced from said outer annulus;

b. producing the solvent, sulfur composite and hydrocarbon from the well;

c. separating the solvent and sulfur composite from the hydrocarbon; and d. recycling and reinjecting the solvent into the production well.

2. The process of claim 1 wherein the solvent is selected from the group consisting of saturated and unsaturated cyclohydrocarbons, and petroleum distillates.

* * * * *

PO-1050
(5/69)

UNITED STATES PATENT OFFICE
CERTIFICATE OF CORRECTION

Patent No. 3744565          Dated July 10, 1973

Inventor(s) Larry P. Brown

It is certified that error appears in the above-identified patent and that said Letters Patent are hereby corrected as shown below:

Column 4, line 53 - after "stream" add --into-- line 54 - delete (at $X=0$ $T_A=I_A$)

Signed and sealed this 27th day of November 1973.

(SEAL)
Attest:

EDWARD M. FLETCHER, JR.
Attesting Officer

RENE D. TEGTMEYER
Acting Commissioner of Patent